United States Patent [19]
Cookson et al.

[11] Patent Number: 4,458,100
[45] Date of Patent: Jul. 3, 1984

[54] GAS INSULATED TRANSMISSION LINE WITH INSULATORS HAVING FIELD CONTROLLING RECESSES

[75] Inventors: Alan H. Cookson, Pittsburgh, Pa.; Bjoun O. Pederson, Chelmsford, Mass.

[73] Assignee: The United States of America as represented by the United States Department of Energy, Washington, D.C.

[21] Appl. No.: 492,066

[22] Filed: May 6, 1983

Related U.S. Application Data

[63] Continuation of Ser. No. 267,949, May 28, 1981, abandoned.

[51] Int. Cl.³ .......................... H02G 5/06; H01B 9/06
[52] U.S. Cl. ...................................... 174/28; 174/99 B
[58] Field of Search ................. 174/16 B, 21 C, 22 C, 174/27, 28, 99 B, 111; 333/244

[56] References Cited

U.S. PATENT DOCUMENTS 3,758,700  9/1973  Ditscheid .............................. 174/28
3,801,725  4/1974  Farish .................................. 174/28

FOREIGN PATENT DOCUMENTS

706448  3/1931  France .............................. 174/21 C
768334  5/1934  France .................................. 174/28

Primary Examiner—Laramie E. Askin
Attorney, Agent, or Firm—M. J. Moran

[57] ABSTRACT

A gas insulated transmission line having a novel insulator for supporting an inner conductor concentrically within an outer sheath. The insulator has a recess contiguous with the periphery of one of the outer and inner conductors. The recess is disposed to a depth equal to an optimum gap for the dielectric insulating fluid used for the high voltage insulation or alternately disposed to a large depth so as to reduce the field at the critical conductor/insulator interface.

6 Claims, 10 Drawing Figures

GAS INSULATED TRANSMISSION LINE WITH INSULATORS HAVING FIELD CONTROLLING RECESSES

GOVERNMENT RIGHTS STATEMENT

The Government has rights in this invention pursuant to Contract No. E-49-18-2061 awarded by the U.S. Department of Energy.

This is a continuation of application Ser. No. 267,949, filed May 28, 1981, now abandoned.

BACKGROUND OF THE INVENTION

1. Field of the Invention

The invention relates in general to gas-insulated transmission lines and in particular to gas-insulated transmission lines having insulators designed to reduce the electric field at the critical insulator conductor interface region.

2. Description of the Prior Art

A common insulator used for supporting the inner high voltage conductor centrally within the outer conductor of a compressed gas insulated transmission line is the cast insulator which is cast in place around the inner conductor or onto a thin metal sleeve which is secured to the inner conductor. A material, such as epoxy, is usually selected which has a coefficient of expansion similar to the metal selected for the inner conductor so as to minimize the possibility of voids being formed at the critical interface where the insulator meets the conductor. This is because such voids are subjected to high electrical fields at the critical insulator conductor interface region, which can lead to ionization within the voids, flashover and a reduced life expectancy for the insulator. This high electrical field at this critical region approaches a value equal to the product of the field at the inner conductor in the gas and the dielectric constant of the insulator. From this it can be seen that selection of an insulator material with a low dielectric constant would have advantages. In the prior art however, epoxy, which has a relatively high dielectric constant of typically 4 to 5, is generally used. The voids at the critical interface region are usually avoided during the casting provided proper procedures such as vacuum casting around the inner conductor are utilized during the manufacture of the insulators. Other materials with lower dielectric constants such as polypropylene or polysulfone with dielectric constants in the range of approximately 2 to 3 have not been successfully molded or cast around typical inner conductors without creating voids since they have much higher coefficients of thermal expansion. However, insulators made from these low dielectric constant materials have been produced by injection molding methods, for example, and have been used successfully as insulators in gas-insulated equipment transmission lines provided the insulator utilizes a conducting layer on the insulator at the conductor interface and/or has shielding rings at the conductor. This has been used with insulators of thick cross section. Thin cross section insulators have been used without the metallizing where an I cross section has been used to maintain a low field at the interface. These thin insulators (less than ¼ inch thick) have limited mechanical properties, and it would be a significant advantage to be able to make them of thicker cross section, which usually then requires metallizing the interface surface of the insulator.

Metallizing the insulator interface surface is expensive and the matallization is subject to flaking, the voids then formed being subject to the same or greater increased fields as at the critical conductor insulator interface. Accordingly, it would be advantageous to have an insulator structure that can be made by the inexpensive methods of production such as injection molding wherein metallizing of surfaces is dispensed with and the finished insulator product by means of suitable design would have a flashover voltage at least as high as the present epoxy systems.

SUMMARY OF THE INVENTION

Briefly, the present invention is a gas insulated transmission line including an outer conductor, an inner conductor adapted for connection to an external energizing source and disposed interiorly within the outer conductor, and an insulator disposed between the inner and outer conductor for insulatably supporting the inner conductor within the outer conductor. The support insulator according to the teachings of the invention has at least one recess and may have two recesses of a predetermined width and depth disposed adjacent and contiguous with one or both the inner and outer conductors, the recess reducing the electric field (created when the inner conductor is energized) along the periphery of the inner and outer conductor at the location of the recess. Several embodiments of the invention reduce the fields along the peripheries of both the inner and the outer conductors. The reduction of the electric field in the gas at the critical insulator conductor interface regions reduces the probability of ionization and flashover. One embodiment of the invention further includes shielding rings disposed on the exterior periphery of the support legs which are defined by the recesses in the insulator to reduce the electric field at the location of the support legs and thereby reduce the probability of flashover occurring at any void between the support leg and conductor interface. The depth of the recesses disposed in the support insulators according to the teachings of the invention is carefully controlled. In one embodiment of the invention the predetermined depth of the recess is set at the optimum gap which gives the highest breakdown field for the dielectric medium disposed in the recess. In another embodiment the predetermined depth of the recess is approximately half the distance between the inner and the outer conductors. This arrangement reduces the electric field at the periphery of both the inner and outer conductors, thereby substantially increasing the flashover voltage of the insulator.

BRIEF DESCRIPTION OF THE DRAWINGS

The invention may be understood and further advantages and uses thereof more readily appreciated when considered in view of the following detailed description of the exemplary embodiments, taken with the accompanying drawings, in which.

DESCRIPTION OF THE PREFERRED EMBODIMENTS

Figure 1:
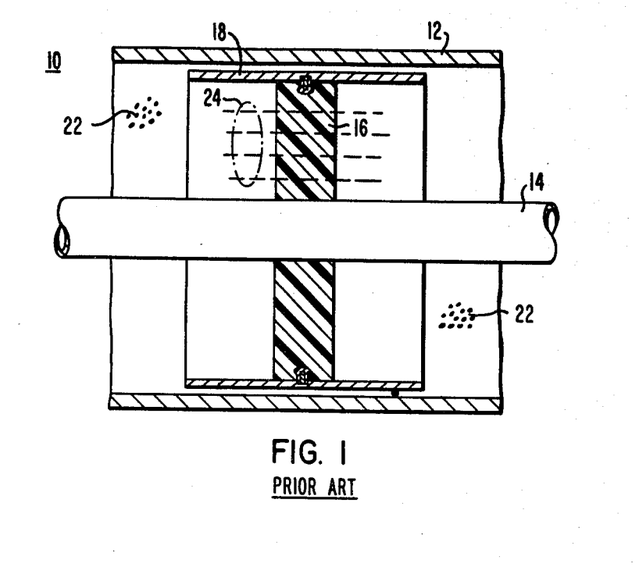
FIG. 1 is a sectional view taken through a gas-insulated transmission line of the prior art showing a typical cast epoxy insulator supporting an inner conductor coaxially wihin an outer conductor.

Throughout this description like elements will be identified by like referenced numerals. Referring now to the drawings and to FIG. 1 in particular there is shown a sectional view of a typical gas-insulated transmission line of the prior art. Gas-insulated transmission line 10 includes outer conductor 12, inner conductor 14 and cast epoxy insulator 16 cast directly onto inner conductor 14. Cast insulator 16 may be secured directly to outer conductor 12 or alternately secured to a particle trap such as shown generally at 18, which particle trap 18 is rigidly or movably secured to outer conductor 12. Particle trap 18 is similar to the particle traps described in U.S. Pat. No. 4,084,064. The outer and inner conductors 12 and 14, respectively, may be formed from copper, aluminum or alloys thereof as is well known in the art. An insulating gas such as sulfur hexafluoride, for example, may be disposed within the annular space between the outer and inner conductors as shown generally at 22. When inner conductor 14 is energized, an electric field E is created within the annular space between the outer and inner conductors. For infinitely long and uniform conductors as the gas insulated transmission lines of this application may be considered to be, uniform equal potential lines such as for example those shown generally at 24 are produced by electric field E. Electric field E within the annular space between the outer and inner conductors may generally be represented by the formula $$E = V/[r_1 \ln (R/r)]$$

where $r_1$ is the radius at which we wish to sample the electric field; R is the radius of the outer conductor, r is the radius of the inner conductor and V is the potential difference between the inner and outer conductors. From this formula we can determine that the the most intense field lies along the periphery of the inner conductor generally decreasing in intensity to the periphery of the outer conductor.

Figure 2:
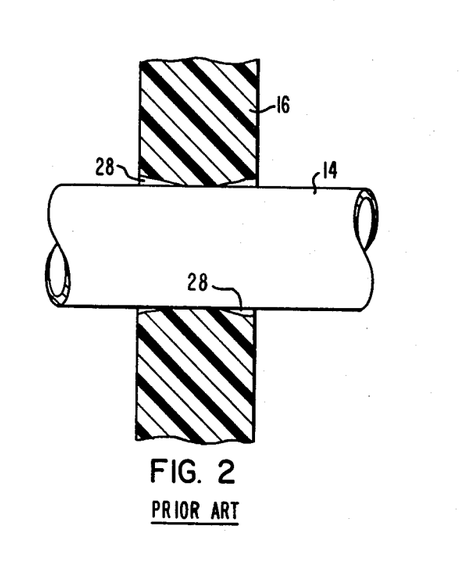
FIG. 2 is an enlarged view of a portion of FIG. 1 showing typical gaps at the critical conductor insulator interface region.

Of particular concern are voids which may occur between the epoxy insulator 16 and the inner conductor or the outer conductor, most critically at the inner conductor since this is the region of the highest electric field intensity. Referring now to FIG. 2 there is shown an enlarged view of the portion of FIG. 1 where the inner conductor interfaces with the insulator. When the insulator is placed around the inner conductor whether by casting, friction fit or otherwise, voids such as those shown generally at 28 can be formed at the insulator conductor critical interface region. A void here between the conductor and the insulator or a void at the interface of the insulator and the outer conductor is subject to a much stronger field than the uniform field E in the annular space between the conductors and may be substantially approximated by $\epsilon E$, where E is the value of the electric field at the inner or outer conductor 14 or 12 respectively, and $\epsilon$ is the value of the dielectric constant of the insulator such as insulator 16. It is for this reason that insulators such as insulator 16 are preferably made from a low dielectric constant material, and the manufacture of the insulators out of these materials must be carefully controlled to prevent voids at this critical interface. For instance, during the casting of the cast epoxy insulators around the inner conductor, the epoxy resin is introduced within an evacuated chamber in order to minimize the production of voids, particularly voids at the critical interface between the inner conductor and the cast insulator. As can be readily appreciated, this is an expensive and time consuming process and although other insulator materials with lower dielectric constants are available, epoxy resin is generally chosen because it has a coefficient of thermal expansion similar to the coefficient of thermal expansion of the metallic materials used for the inner conductors. Other dielectric materials having lower dielectic constants such as polypropylene or polysulfone would reduce the value of the field approximated bby $\epsilon E$ present in voids between the cnductor and the insulators and could be produced by the less expensive methods of injection molding, but, when friction fitted over the inner conductor, voids at the critical interface are always present. Even though the field within such voids is less than they would be than with an insulator made from a higher dielectric constant material such as epoxy, there is still the danger that the increased field approximated by $\epsilon E$ would cause ionization in the insulating gas in the voids and initiate flashover or puncture through the insulator.

Figure 3:
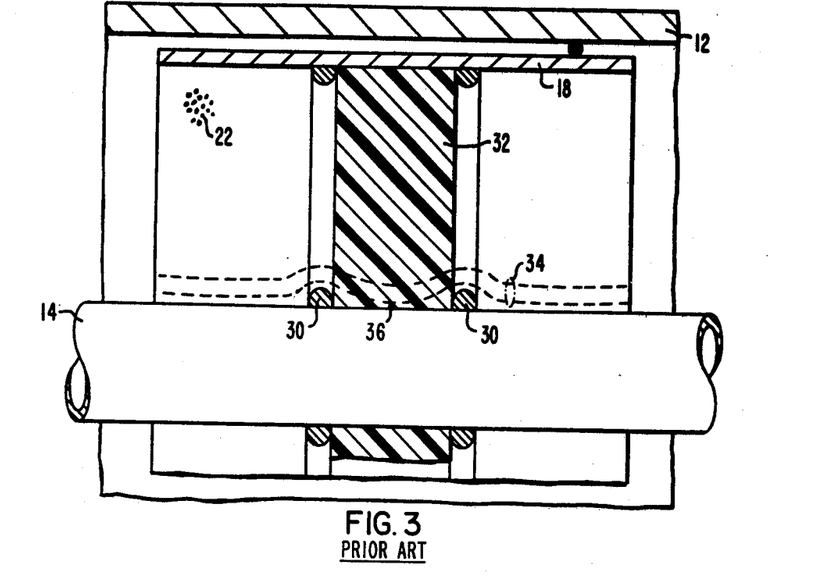
FIG. 3 is a sectional view taken through a gas-insulated transmission line of the prior art showing a thick insulator supporting the inner conductor with shielding rings mounted adjacent the insulator and equipotential lines.
Figure 4:
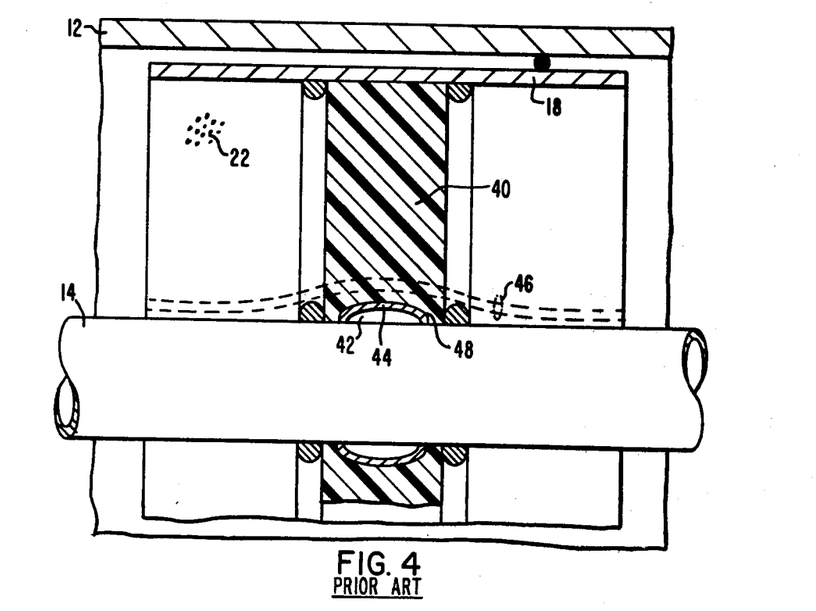
FIG. 4 is a sectional view taken through a gas-insulated transmission line of the prior art showing a metallized internal groove disposed on an insulator at the critical insulator conductor interface and the equipotential lines.

One of the solutions of the prior art is shown in FIG. 3 wherein metallic shielding rings such as metallic rings 30 are disposed on inner conductor 14 and outer conductor 12 or alternately particle trap 18 on either side of insulator 32 to reduce the electric field at the periphery of the conductors as is shown by the bending of equal potential lines 34 approximate inner conductor 14. However in order to use low dielectric constant insulators such as polysulfone or polypropylene which would have sufficient mechanical strength to be able to support, for example the equivalent of 20 feet of conductor, as is the present practice, it is necessary to use a rather thick cross section of low dielectric constant material for the insulator as shown at insulator 32. With a relatively thick cross sectioned insulator the electric field towards the mid-point 36 of the critical insulator conductor interface is not subject to the shielding effect of the metallic shielding rings and approaches the normal field intensity as though the shielding rings were not present. As mentioned earlier, the low dielectric material insulators have a friction fit over inner conductor 14 and will have voids at the interface with inner conductor 14. For this reason other insulators of the prior art have been designed as shown in FIG. 4 wherein insulator 40 has an internal recess 42 disposed at a depth substantially equal to the height of the shielding rings and coated with a conducting layer such as conducting layer 44 to reduce the electric field at the location of internal recess 42 and bend the equal potential lines such as equal potential lines 46 radially outward along the entire cross section of the insulator. Conducting layer 44 then is at the potential of the inner conductor 14 and thereby eliminates the field in internal recess 42 and correspondingly eliminates any problem areas of voids located next to the periphery of the inner conductor. However one of the problems involved with this solution of the prior art is that voids may be produced between conducting layer 44 and the adjacent portion of insuator 40 as for example in the production of the insulator or when flaking of the metallic layer would occur. These voids have the same intense field and are subject to flashover just as voids over the inner conductor as depicted in FIG. 1. Voids at some locations along metallic conducting layer 44 would even experience a much greater field as for example near corners 48. Another disadvantage of providing internal recesses such as internal recess 42 with metallic conducting layers such as conducting layer 44 is that it involves an expensive process that is eliminated on the insulator arrangements according to the teachings of the invention.

Figure 5:
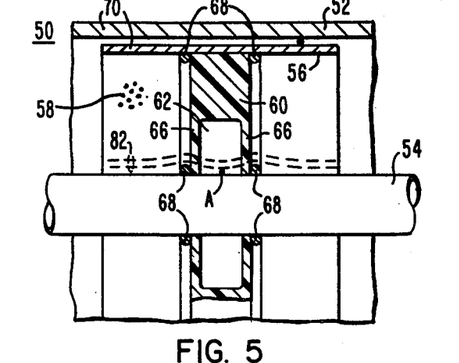
FIG. 5 is a sectional view taken through an embodiment of a gas-insulated transmission line constructed according to the teachings of the invention showing an insulator supporting an inner conductor wherein the insulator has a large recessed region extending a substantial depth within the insulator and contiguous with the inner conductor.
Figure 6:
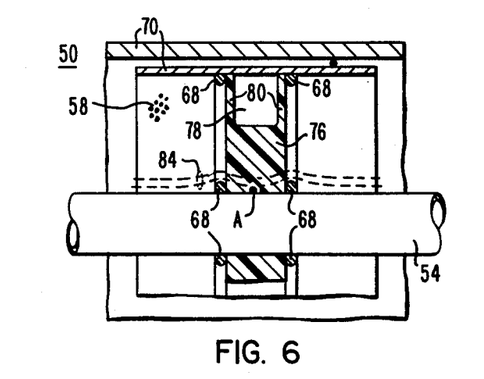
FIG. 6 is a sectional view taken through another embodiment of a gas-insulated transmission line constructed according to the teachings of the invention showing an insulator supporting the inner conductor wherein the insulator has a large recessed region extending a substantial depth within the insulator and contiguous with the outer conductor.

Referring now to FIG. 5 there is shown a sectional view taken through gas insulated transmission line 50 constructed according to the teachings of the invention. Gas insulated transmission line 50 includes outer coductor 52, inner conductor 54, particle trap 56 which is electrically connected and mechanically secured to outer cnductor 52, insulating gas such as sulfur hexafloride shown generally at 58 and insulator 60. Insulator 60 has a large recess 62 disposed so as to be proximate and contiguous with inner conductor 54 and extends a substantial depth, as for example 20%-80% of the depth of insulator 60. Recess 62 extends substantially the full width of insulator 60 to define two support legs 66, which support legs 66 have only the width necessary for the requisite mechanical strength to support and space said inner and outer conductors 54 and 52 respectively. Shielding rings 68 are disposed alongside insulator 60 at the peripheries of the inner conductor 54 and the outer conductor 52 or particle trap 56. For purposes of the description of the preferred embodiments and the examples set forth herein, outer conductor 52 and particle trap 56, since they are secured together both mechanically and electrically, may be considered to be the same entity and will be referred to as the outer sheath 70. Referring now to FIG. 6 there is shown another embodiment of gas insulated transmission line 50 wherein insulator 76 now has a large recess 78 disposed in insulator 76 so as to be contiguous with outer sheath 70. Again recess 78 has a substantial depth, for example approximately 20%-80% of the depth of insulator 76, and a substantial width to define support legs 80 of insulator 76 having only the necessary width for the requisite mechanical strength to support and space the inner conductor 54 from the outer sheath 70. The concept of disposing the large recess in insulators 60 and 76 of FIGS. 5 and 6 is to reduce the field in the gas gap at the conductors whether at the inner conductor or the outer sheath by reducing the amount of solid dielectric in series. Thus, in the regions in the center of the insulator, for example the region marked point A along the inner conductors of FIGS. 5 and 6, which are not sufficiently shielded by the shielding rings such as shielding rings 68, the field here is reduced compared with the case where the dielectric insulator extends across the complete annular space between inner conductor 54 and outer sheath 70.

For an example of the above insulator arrangement consider a 242 kV size system with an inner conductor four inches in outside diameter, an outer sheath 11.5 inches inside diameter, and a simple disc insulator of dielectric constant $\epsilon = 3$, such as shown in FIG. 1 of the prior art, and assuming the insulator has a substantial width and the usual coaxial field exists in the axial space between the inner conductors and the outer sheath, the electric field in any gap (such as is shown in FIG. 2) underneath the insulator at the periphery of the inner conductor at the regions depicted by point A in FIGS. 5 and 6 can be shown to be 1.41 V/in., where V is the applied voltage. In FIG. 5 where the diameter of recess 62 is seven inches, the electric field at point A, assuming that insulator 60 has the same substantial width, is 0.69 V/in., a reduction of 51% compared to the electric field present in a gap as shown in FIG. 2 of the solid insulator of FIG. 1. For the case in FIG. 6 where recess 78 is disposed at the depth of two inches, the field in a gap at point A will be 0.72 V/in., a reduction of 49% compared to the electric field present in the gap as shown in FIG. 2 for the plain disc insulator of the prior art as depicted in FIG. 1. Note that the equipotential lines such as equipotential lines 82 in FIG. 5 and equipotential lines 84 in FIG. 6 are shaped similar to those of FIG. 3, but now there is not a gap with a large amount of solid dielectric in series with it to produce the strong $\epsilon E$ field.

Figure 7:
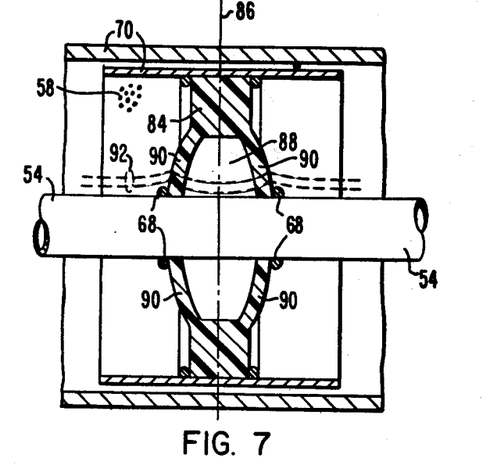
FIG. 7 is a section view taken through another embodiment of a gas-insulated transmission line constructed according to the teachings of the invention showing an insulator supporting the inner conductor wherein the support legs of the insulator defined by the large recessed region have arcuate shapes disposed at predetermined angles relative to the inner conductor in order to further reduce the field at the critical insulator conductor interface.
Figure 8:
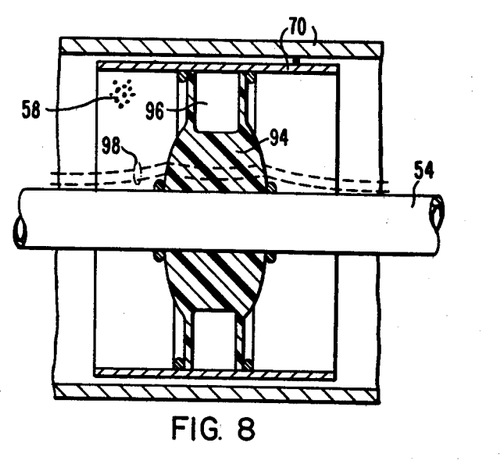
FIG. 8 is a sectional view taken through another embodiment of a gas-insulated transmission line constructed according to the teachings of the invention showing an insulator having a large recess extending a substantial depth within the insulator and contiguous with the outer conductor wherein the inner body of the insulator that is contiguous with the inner conductor has arcuate surfaces disposed at predetermined angles with the horizontal so as to reduce the electric field at the conductor-insulator critical interface region.

Referring now to FIG. 7 there is shown another embodiment of the invention wherein the profile of the insulator further reduces the field at the critical conductor insulator interface. Insulator 84 is disposed along an axis 86 which is perpendicular to the axes of the inner conductor and the outer sheath 54 and 70 respectively. Insulator 84 again includes a large recess 88 which extends a substantial portion of the depth, as for example 20%-80% of the depth of insulator 84, and defines support legs 90. Insulator 84 is no longer disc shaped but has support legs 90 bent outwardly from the axis 86 of insulator 84 to form acute interior angles with the axis of inner conductor 54. This design of insulator 84 itself reduces the field underneath the insulator at the critical insulator conductor interface by bending the equipotential lines radially outward at the transition between the insulating gas 58 and the outer periphery of support legs 90 which are disposed at predetermined acute interior angles, as for example 60°, to the axis of inner conductor 54. This embodiment of the invention controls the electrical field within recess 88 by disposing the exterior periphery of the dielectric insulator itself at a predetermined angle from the axis of the conductor which angle is determined as a function of the dielectric constant of the material of which insulator 84 is made and the dielectric constant of the insulating fluid medium. The equipotential lines, such as equipotential lines 92, enter insulator 84 at the region of support legs 90 and will bend radially outwardly from inner conductor 54 in a manner analogous to the refraction of light entering a lens, which thereby provides control of the electrical field under the legs 90. Referring now to FIG. 8 there is shown an embodiment of the invention wherein insulator 94 has the substantial recess 96 disposed approximate and contiguous with outer sheath 70. Again, insulator 94 is no longer disc shaped but the periphery of insulator 94 approximate inner conductor 54 is now disposed at predetermined angles outwardly so as to form acute interior angles with the axes of inner conductor 54 to bend equipotential lines 98 radially outwardly at the transition between insulating gas 58 and the periphery of insulator 94 that is approximate inner conductor 54. Equipotential lines 98 are bent radially outwardly and there is a reduction in electrical field approximate the periphery of the inner conductor 54 for the same reasons as described for insulator 84 of FIG. 7, that is, the profile of insulator 94 itself reduces the field at the conductor spacer interface. Note that the peripheries of the insulators may be disposed at acute interior angles with the outer conductor with the same results as the inner conductor described in FIGS. 7 and 8.

Figure 9:
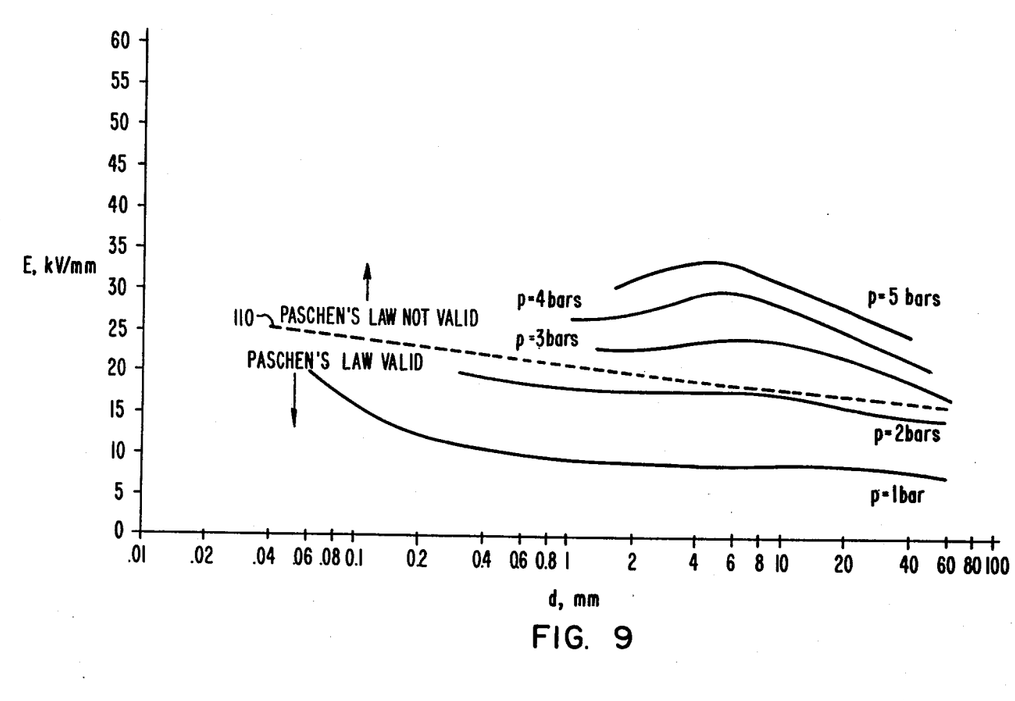
FIG. 9 is a graph of the prior art depicting the breakdown field vs. spacing in $SF_6$ gas at pressures of 1 to 5 bars at 25° C., and a uniform field.
Figure 10:
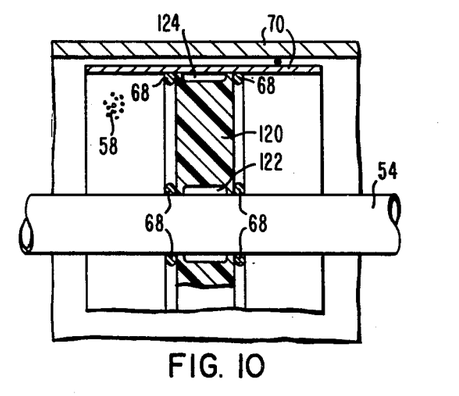
FIG. 10 is a sectional view taken through another embodiment of a gas insulated transmission line constructed according to the teachings of this invention showing an insulator having recesses of a predetermined width and the optimum depth for the dielectric insulating fluid disposed on the annular space within the outer conductor.

Referring now to FIG. 9 there is shown a graph of breakdown field versus spacing in sulfur hexafluoride insulating gas at pressures of 1 to 5 bars at 25 C., uniform field. This graph was generated by plotting empirical data from the breakdown voltage as a function of pressure p and uniform gap d that is well known in the art and that resulted from experimental tests. The curves above the Paschen's law validity boundary shown generally at 110, show an unexpected result of a breakdown field maximum at an optimum gap; for example at 5 bars the graph shows an optimum gap of 5 millimeters. Smaller gaps have a lower breakdown field, as do higher gaps. Accordingly, another embodiment of the invention is shown in FIG. 10 wherein insulator 120 has a recess region 122 contiguous with inner conductor 54 in the center of the insulator and substantially the full width of the insulator, having a depth equal to this optimum gap derived from FIG. 9. Recessed region 122 does not have a conducting surface on the insuator and still provides a substantial field reduction at the periphery of inner conductor 54. Insulator 120 also has a recess 124 disposed in proximitty to the outer sheath 70 for the same purposes.

In conclusion there has been disclosed a gas insulated transmission line including a novel insulator having one or more recesses which supports the inner conductor concentrically inside the outer sheath. The high voltage insulation is typically but not limited to compressed sulfur hexafluoride gas at a typical pressure of 50 psig, approximately 5 bars. The insulator according to the teachings of the invention is made from a slab of low dielectric constant material which slides over the conductor in a friction fit which allows the sulfur hexafluoride gas or other insulating fluid to flow into the recesses. The configuration may also include electrostatic shielding rings on the conductors. The internal surface of the insulator is recessed so as to have a gap at the conductor which has the optimum breakdown field. An alternative embodiment discloses a very large recess in the insulator so as to reduce the field at the conductor. The insulators can be used as a direct replacement for the present cast epoxy insulators of the prior art and have the advantage of lower cost. The insulators, which are amenable to injection molding methods of production, do not require vacuum casting around inner conductors or metallizing of interior recesses. These insulators may be formed of polypropylene or polysulfone or other suitable materials since the coefficient of expansion of the material is no longer critical. Since the insulators according to the teachings of the invention do not have to be cast in place, the coefficient of thermal expansion of the insulating material does not become prohibitive. The insulators, while having a lower cost than present epoxy insulator systems, by suitable design as disclosed herein, have a flashover voltage at least as good as the present epoxy systems.

The teachings of the invention were illustrated by reference to gas insulated transmission lines because the present invention solved certain problems formed in that product. The invention, however, is broadly applicable to insulators for spacing apart two conductors at different voltages. In particular, the insulating gas and the shielding rings are not necessary, but are used to enhance the voltage separating capabilities of the insulators. It is the design of the insulators themselves that provide the advantages of the invention.

We claim:

1. A transmission line, comprising:
    (a) a hollow outer conductor;
    (b) an inner conductor adapted for connection to an energizing source and disposed within said outer conductor; and
    (c) insulator means disposed between said inner and said outer conductors for insulatingly supporting said inner conductor within said outer conductor, said insulator means having a recess of a predetermined width and depth disposed adjacent and contiguous with one of said inner or outer conductors, the periphery of said recess comprising electrically insulating material and being devoid of any electrically conductive material thereon, said recess eliminating voids which are subject to high electrical stresses and which may be present at the conductor/insulator means interface along the portion of the one of said inner and outer conductors wherein said recess is located and reducing the electric field produced with the inner conductor is energized along the periphery of the portion of the other of said conductors opposite the location of said recess; said predetermined width of the recess being sufficiently extensive to define two support legs having the requisite mechanism strength to support the inner conductor, and wherein the conductors are located along a first axis and the insulator means is located along a second axis, said first and second axes being perpendicular to each other, wherein said support legs are bent outwardly from the axis of the insulator means to thus shape electrical equipotential lines radially outwardly at the support legs.

2. The transmission line of claim 1 wherein the support legs have an arcuate shape to reduce abrupt transitions along the surfaces of the insulator means.

3. A transmission line, comprising:
(a) a hollow outer conductor;
(b) an inner conductor adapted for connection to an energizing source and disposed within said outer conductor; and
(c) insulator means disposed between said inner and said outer conductors for insulatingly supporting said inner conductor within said outer conductor, said insulator means having a recess of a predetermined width and depth disposed adjacent and contiguous with one of said inner or outer conductors, the periphery of said recess comprising electrically insulating material and being devoid of any electrically conductive material thereon, said recess eliminating voids which are subject to high electrical stresses and which may be present at the conductor/insulator means interface along the portion of the one of said inner and outer conductors wherein said recess is located and reducing the electric field produced when the inner conductor is energized along the periphery of the portion of the other of said conductors opposite the location of said recess;
said predetermined width of the recess being sufficiently extensive to define two support legs having the requisite mechanical strength to support the inner conductor, and wherein the conductors are disposed along a first axis and the insulator means is disposed along a second axis, said first and second axes being perpendicular to each other and the peripheral surface of the insulator means at the opposite end from where the recess is located is bent outwardly from the axis of the insulator means to thus shape electrical equipotential lines radially outwardly at said peripheral surface.

4. A gas insulated transmission line comprising:
(a) an outer conductor;
(b) an inner conductor adapted for connection to an energizing source and disposed interiorly within said outer conductor;
(c) an insulator disposed between said inner and said outer conductors for insulatingly supporting said inner conductor within said outer conductor, said insulator having a recess of a predetermined width and depth disposed adjacent and contiguous with one of said inner and outer conductors, the periphery of said recess comprising electrically insulating material and being devoid of any electrically conductive material thereon, said recess eliminating voids that are highly electrically stressed when said inner conductor is energized and which may be present at the conductor/insulator interface along the portion of the one of said inner and outer conductors wherein said recess is located and reducing the electric field, created when said inner conductor is energized, along the periphery of the portion of the other of said conductors opposite the location of said recess; and
(d) an insulating gas disposed within the annular space between the said outer and inner conductors;
said predetermined width of the recess extending a substantial portion of the width of the insulator to define two support legs having only the width necessary for the requisite mechanical strength to space apart the inner and outer conductors and support the inner conductor, and wherein the conductors are located along a first axis and the insulator is located along a second axis, said first and second axes being perpendicular to each other, and the support legs are bent outwardly from the axis of the insulator to bend the equipotential lines, created when said inner conductor is energized, radially outwardly at the transition between the insulating gas and the insulating material of the support legs.

5. The gas insulated transmission line of claim 4 wherein the support legs have an arcuate shape to reduce abrupt transitions along the surfaces of the insulator where increased fields would be produced.

6. A gas insulated transmission line comprising:
(a) an outer conductor;
(b) an inner conductor adapted for connection to an energizing source and disposed interiorly within said outer conductor;
(c) an insulator disposed between said inner and said outer conductors for insulatingly supporting said inner conductor within said outer conductor;
said insulator having a recess of a predetermined width and depth disposed adjacent and contiguous with one of said inner and outer conductors, the periphery of said recess comprising electrically insulating material and being devoid of any electrically conductive material thereon, said recess eliminating voids that are highly electrically stressed when said inner conductor is energized and which may be present at the conductor/insulator interface along the portion of the one of said inner and outer conductors wherein said recess is located and reducing the electric field, created when said inner conductor is energized, along the periphery of the portion of the other of said conductors opposite the location of said recess; and
(d) an insulating gas disposed within the annular space between said outer and inner conductors;
said predetermined width of the recess extending a substantial portion of the width of the insulator to define two support legs having only the width necessary for the requisite mechanical strength to space apart the inner and outer conductors and support the inner conductor, and wherein the conductors are disposed along a first axis and the insulator is disposed along a second axis, said first and second axes being perpendicular to each other, and the peripheral surface of the insulator at the opposite end from where the recess is located is bent outwardly from said axis of the insulator to bend the equipotential lines, created when said inner conductor is energized, outwardly at the transition between the insulating gas and the insulating material of the insulator.

* * * * *